United States Patent [19]

Muramatsu et al.

[11] Patent Number: 5,128,762
[45] Date of Patent: Jul. 7, 1992

[54] IMAGE FORMING APPARATUS WITH IMBRICATED DISCHARGE OF RECORDING PAPER TO IMPROVE VISUAL RECOGNITION OF SORTED GROUPS

[75] Inventors: Hideo Muramatsu; Munehiro Nakatani; Hiroaki Hamamo; Shigenobu Fukushima; Toshio Tsuboi; Kanako Hamano, all of Osaka, Japan

[73] Assignee: Minolta Camera Kabushiki Kaisha, Osaka, Japan

[21] Appl. No.: 453,767

[22] Filed: Dec. 20, 1989

[30] Foreign Application Priority Data

Dec. 19, 1988 [JP] Japan ............... 63-321539
Dec. 19, 1988 [JP] Japan ............... 63-321540
Dec. 19, 1988 [JP] Japan ............... 63-321541

[51] Int. Cl.$^5$ .............. H04N 1/00; G03G 21/00; B65H 29/66; B65H 29/20
[52] U.S. Cl. .................... 358/296; 358/498; 355/323; 271/216; 271/902
[58] Field of Search ............. 355/321, 322, 323, 325; 271/176, 216, 233, 902; 358/498, 296

[56] References Cited

U.S. PATENT DOCUMENTS

| | | | |
|---|---|---|---|
| 2,805,757 | 9/1957 | Rapley | 271/216 X |
| 2,925,167 | 2/1960 | Lindberg | 271/216 X |
| 4,318,539 | 3/1982 | Lamos | 270/58 |
| 4,354,787 | 10/1982 | Gensike | 414/54 |
| 4,627,706 | 12/1986 | Takahashi et al. | 355/323 X |
| 4,664,507 | 5/1987 | Fukae et al. | 355/323 X |
| 4,811,111 | 3/1989 | Kurokawa | 379/100 X |
| 4,817,933 | 4/1989 | Honjo et al. | 271/902 X |
| 4,866,487 | 9/1989 | Ohuchi et al. | 355/323 X |
| 4,905,979 | 3/1990 | Limbach et al. | 271/176 |
| 4,973,039 | 11/1990 | Jeske et al. | 271/216 X |

FOREIGN PATENT DOCUMENTS 60-45103 10/1985 Japan .
62-171263 7/1987 Japan .

Primary Examiner—Benjamin R. Fuller
Assistant Examiner—Eric Frahm
Attorney, Agent, or Firm—Willian Brinks Olds Hofer Gilson & Lione

[57] ABSTRACT

A facsimile machine has a paper discharge tray, and a device for shifting image-carrying recording paper as placed on the discharge tray. The recording paper further carries information relating to senders as recorded on a leading end margin thereof. The shifting device is operable for shifting the recording paper in the direction of paper discharge in timed relation to an operation for recording each series of image data. Consequently, the recording paper is sorted on the discharge tray for visual identification of the senders.

11 Claims, 16 Drawing Sheets

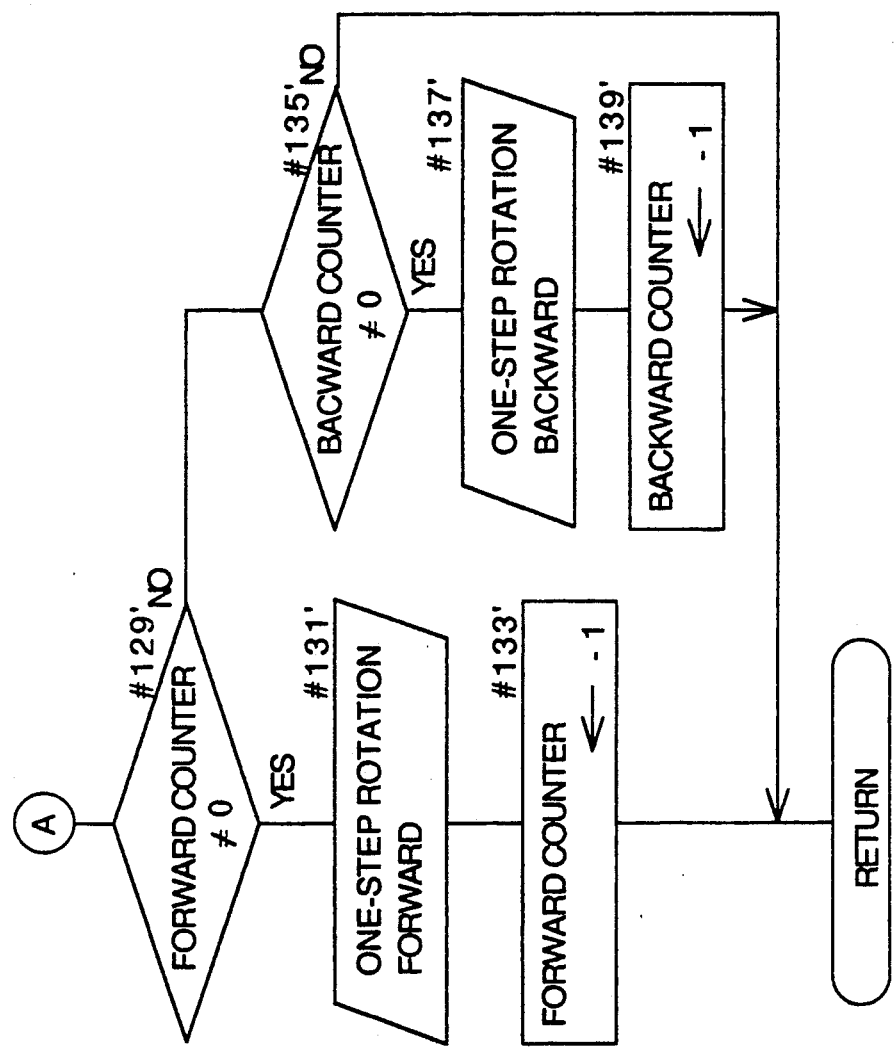

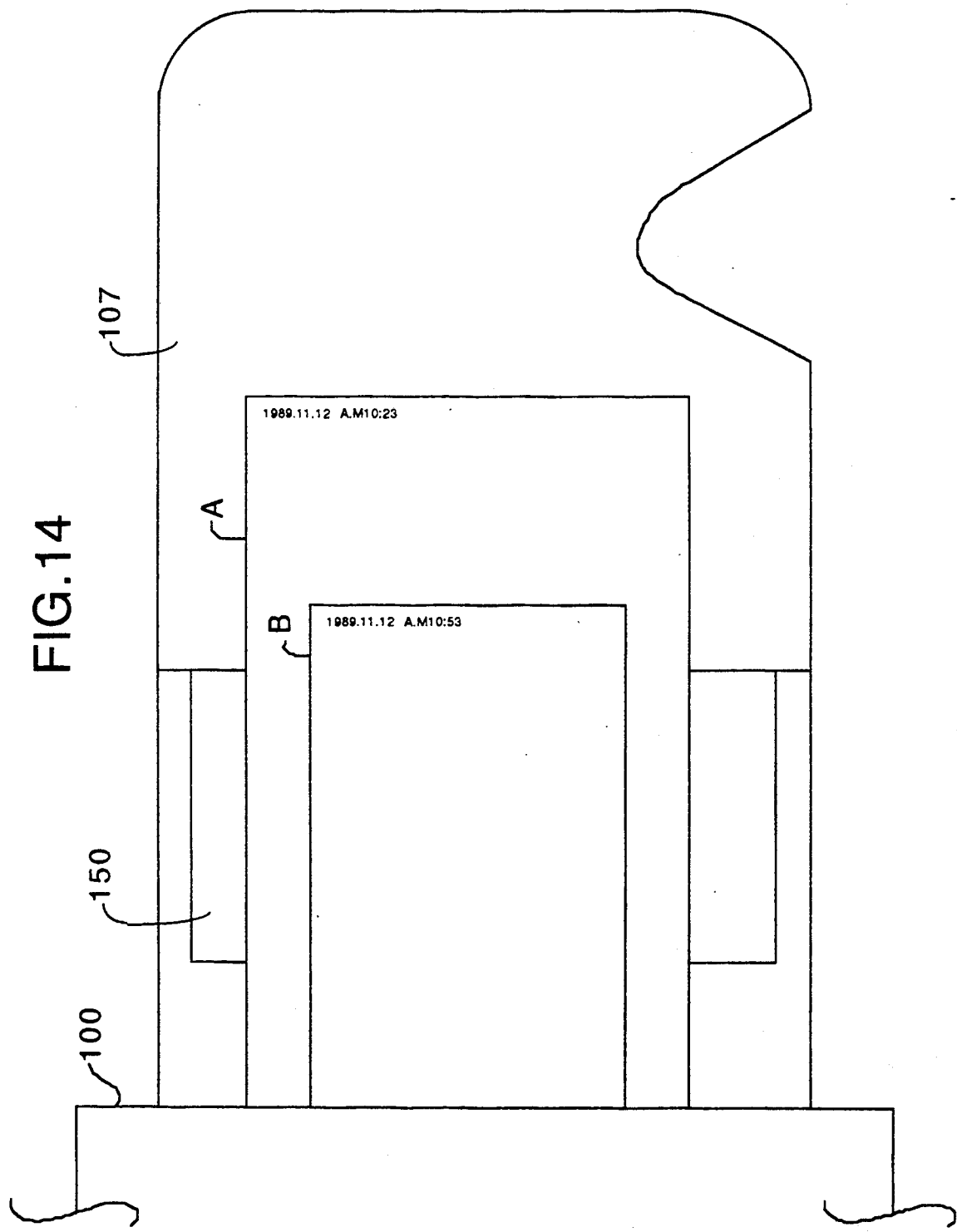

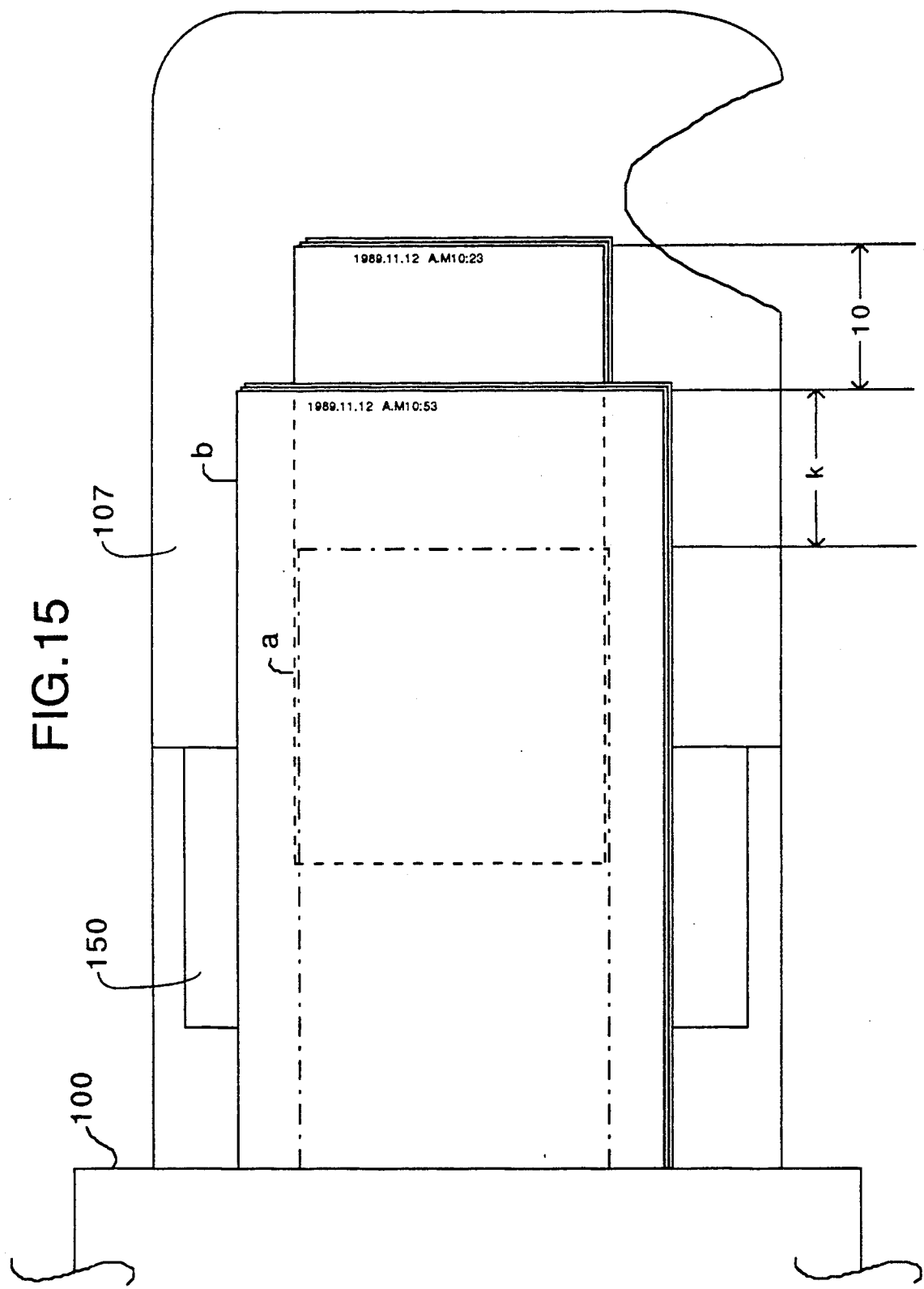

IMAGE FORMING APPARATUS WITH IMBRICATED DISCHARGE OF RECORDING PAPER TO IMPROVE VISUAL RECOGNITION OF SORTED GROUPS

BACKGROUND OF THE INVENTION (1) Field of the Invention

The present invention relates to image forming apparatus such as a facsimile machine and a copying machine, and more particularly to an image forming apparatus having a function to sort out image-carrying recording paper discharged onto a tray according to different series of image-forming operations.

(2) Description of the Prior Art

An image forming apparatus is known, which reproduces on recording paper image data received through a communication line or image data obtained by image scanning, and discharges the recording paper onto a tray.

With the above image forming apparatus, in particular a facsimile machine, the image data are often reproduced when receiving persons are away from the apparatus. As a result, sheets of the recording paper having varied contents are stacked on the discharge tray (and in the case of a large office, generally, incoming facsimile messages are addressed to different workers).

Under such circumstances, the recording paper must be sorted out according to individual communications.

SUMMARY OF THE INVENTION

An object of the present invention is to provide an image forming apparatus having a function to automatically sort out recording paper according to different series of image forming operations.

The above object is fulfilled, according to the present invention, by an image forming apparatus in which the recording paper carrying images recorded in an operation for recording a series of image data is moved a predetermined distance in timed relation to the recording operation, thereby distinguishing the recording paper from recording paper to be used in a subsequent recording operation.

In the case of a facsimile machine, for example, the discharged recording paper is shifted a predetermined distance for every data communication received. In this way, sheets of the recording paper are displaced for sorting according to individual communications.

Where information relating to the senders (such as their telephone numbers) is recorded on an end margin of the recording paper at times of image reproduction, such information may be visually recognized by shifting the recording paper about 10mm.

In a preferred embodiment of the invention, the recording paper is shifted by a distance necessary for sorting, based on the size of recording paper used for recording a previous series of image data and the size of the recording paper to be used for recording the current series of image data. This assures reliable sorting even when the size of paper used previously differs from the size of paper to be used next.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 13A and 13B are flowcharts of a shift tray subroutine executed in the second embodiment, and FIGS. 14 and 15 are schematic plan views illustrating differences in recording paper size, respectively.

DETAILED DESCRIPTION OF THE PREFERRED EMBODIMENTS

Embodiments of the present invention will be described hereinafter.

First Embodiment

Description will be made in the order of "Paper Discharge Tray and Adjacent Components", "Image Recording Section", "Image Scanning Section", "Control Panel", "Control Circuit" and "Processing by CPU".

(Paper Discharge Tray and Adjacent Components)

Figure 1:
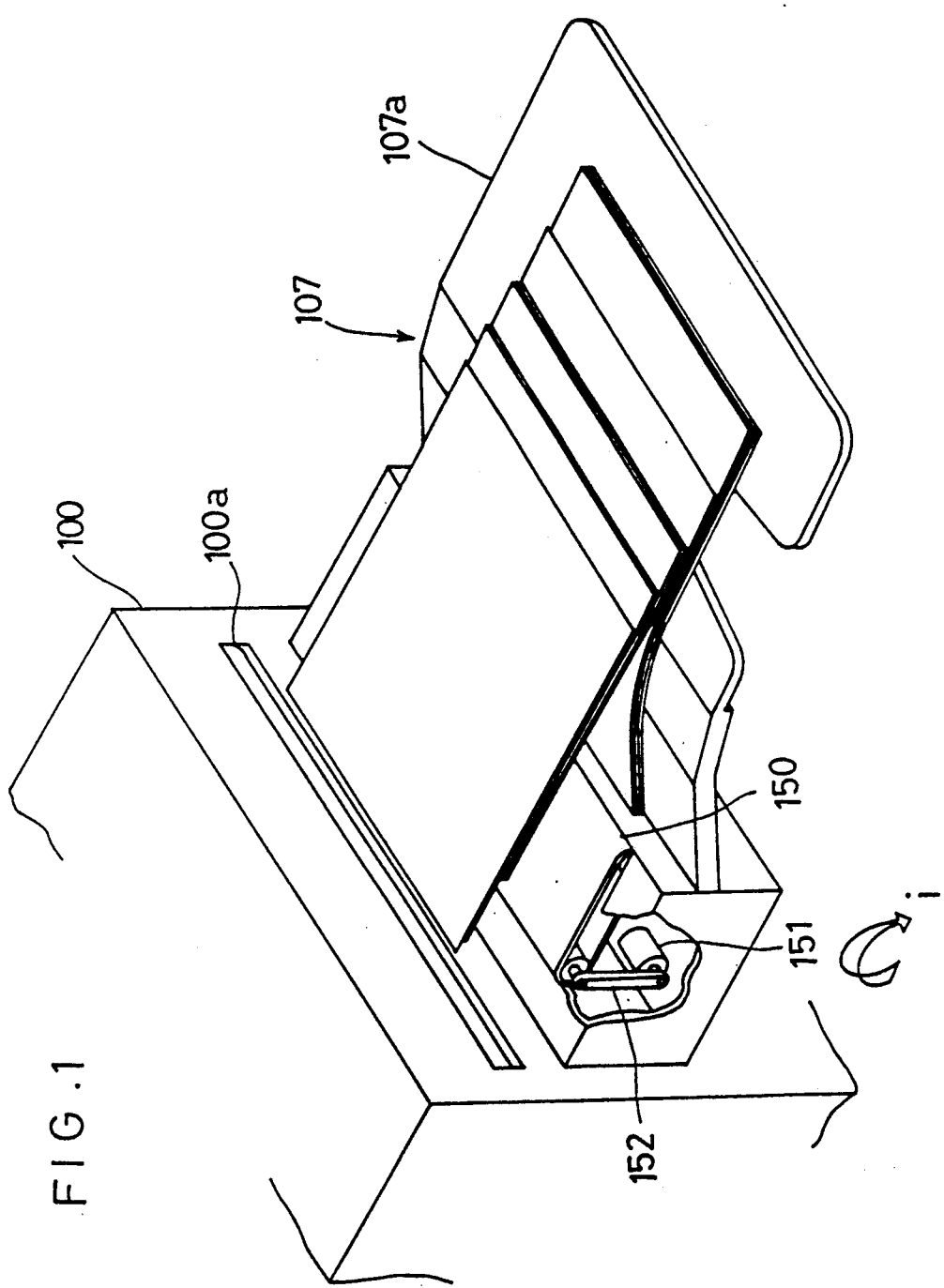
FIG. 1 is a fragmentary perspective view of a facsimile machine according to the present invention, with a paper discharge tray loaded with recording paper.
Figure 2:
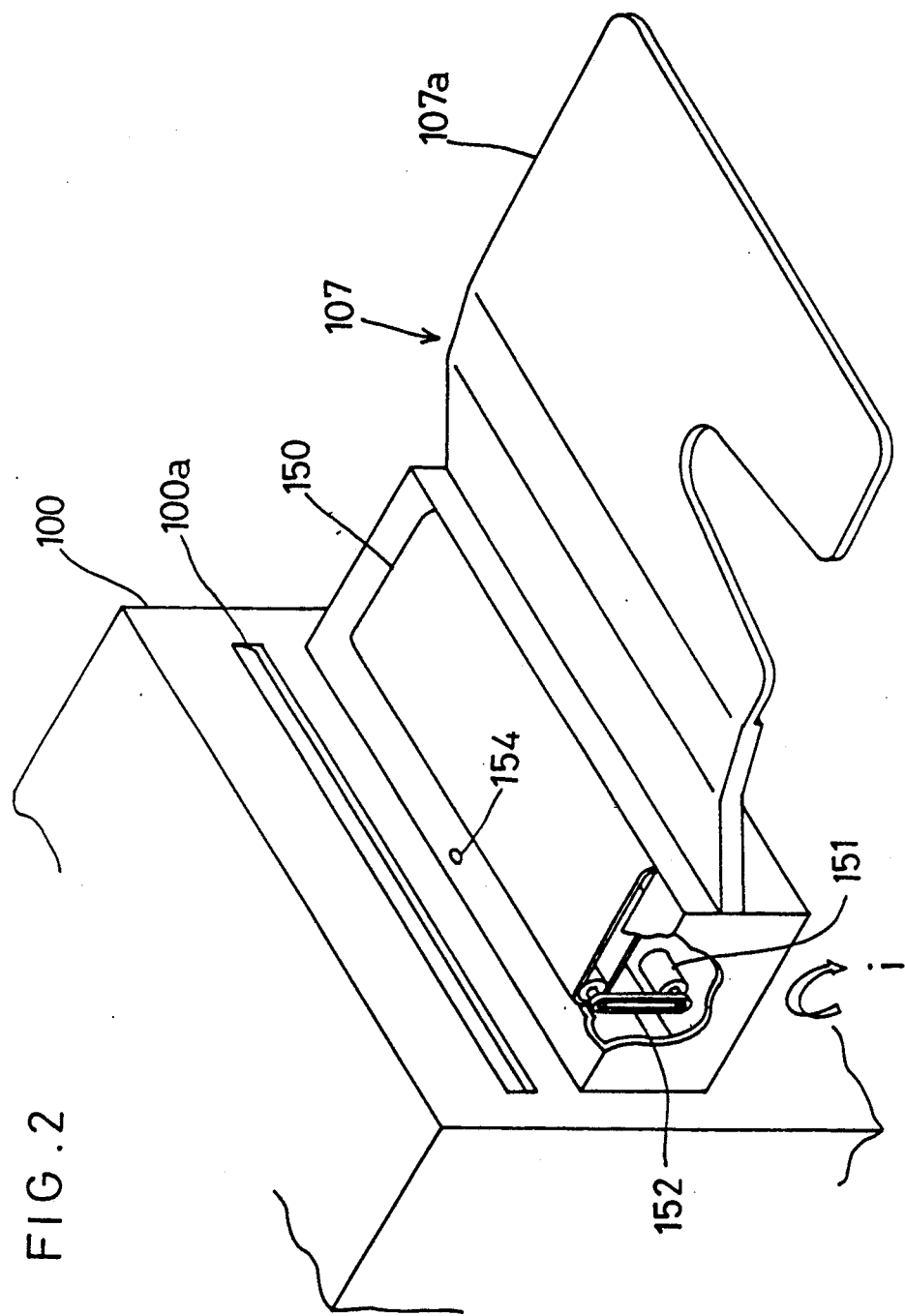
FIG. 2 is a view similar to FIG. 1, with the paper discharge tray in an empty state.

FIGS. 1 and 2 are perspective views of a paper discharge tray and adjacent components of a facsimile machine embodying the present invention. FIG. 1 shows sheets of recording paper as sorted. FIG. 2 shows a state of the tray empty of recording paper.

As shown, a tray 107 is attached to a side wall 100 of a main body of the facsimile machine with a high friction rubber belt 150 in between.

The rubber belt 150 is driven by a stepper motor 151 through a belt 152 for transporting recording paper on the rubber belt 150. This rubber belt 150 is normally driven in the direction of arrow i. Reference numeral 154 denotes a recording paper sensor for detecting presence or absence of recording paper on the tray 107.

When recording paper is to be discharged onto the tray 107 upon receipt of data, the rubber belt 150 is driven forward (in the direction of arrow i) before discharge of a first sheet of the recording paper. This step is taken in order to shift already discharged recording paper a slight distance rightward in FIGS. 1 and 2 prior to discharge of further recording paper resulting from receipt of new data. By so shifting the preceding recording paper, a leading end portion thereof (the right-hand margin where, usually, the telephone number and other information identifying the sender are recorded) will not be covered by the newly discharged recording paper.

The shifting distance is, for example, 10mm (which roughly corresponds to the width for recording the information identifying the sender).

Previously discharged recording paper is successively shifted rightward prior to discharge of further recording paper occurring with each new data receipt. As a result, sheets of recording paper are sorted out according to the order of discharge as shown in FIG. 1. When the number of communications exceeds the sorting capacity, sheets of the recording paper are stacked successively from the first discharge onward, upon a forward portion 107a of the tray 107. Thus, the tray 107 is capable of holding all of the discharged recording paper.

In this embodiment, discharged sheets of recording paper are sorted by being shifted in the direction in which the sheets are discharged. However, the construction and driving arrangement of rubber belt 150 may be varied for shifting and sorting the recording paper in a direction perpendicular to the direction of discharge.

Figure 11:
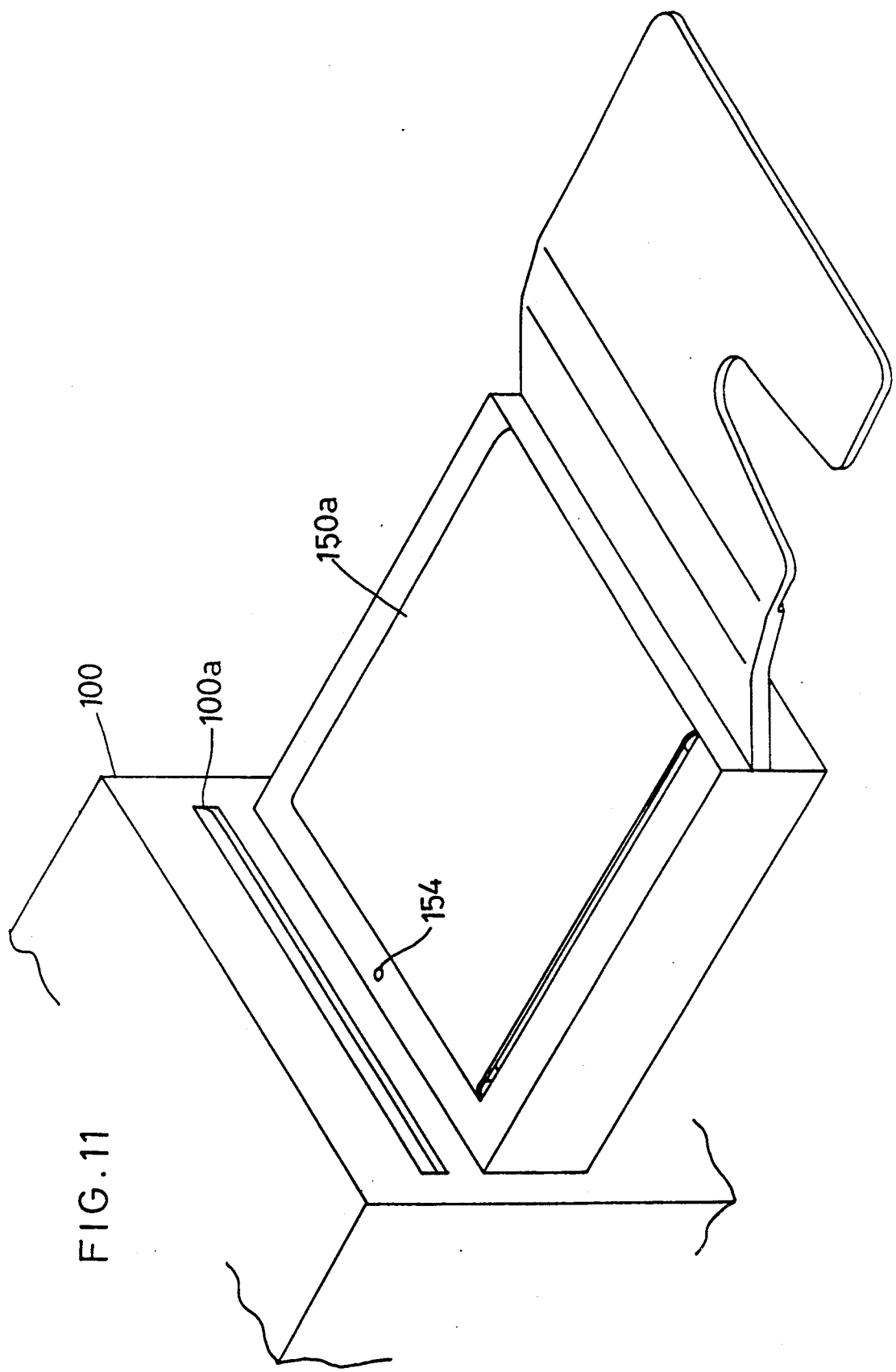
FIG. 11 is a fragmentary perspective view of a discharge tray and adjacent components of a modified facsimile machine.

Further, as shown in FIG. 11, a longer rubber belt 150a than the rubber belt 150 in this embodiment may be provided for sorting a greater number of recording sheets. Moreover, the transporting device may be used as the tray, in which case the transporting device may just be stopped when the number of communications reaches its sorting capacity. The tray 107 itself may be adapted to be movable, and the recording paper may be shifted vertically.

{Image Recording Section}

Figure 3:
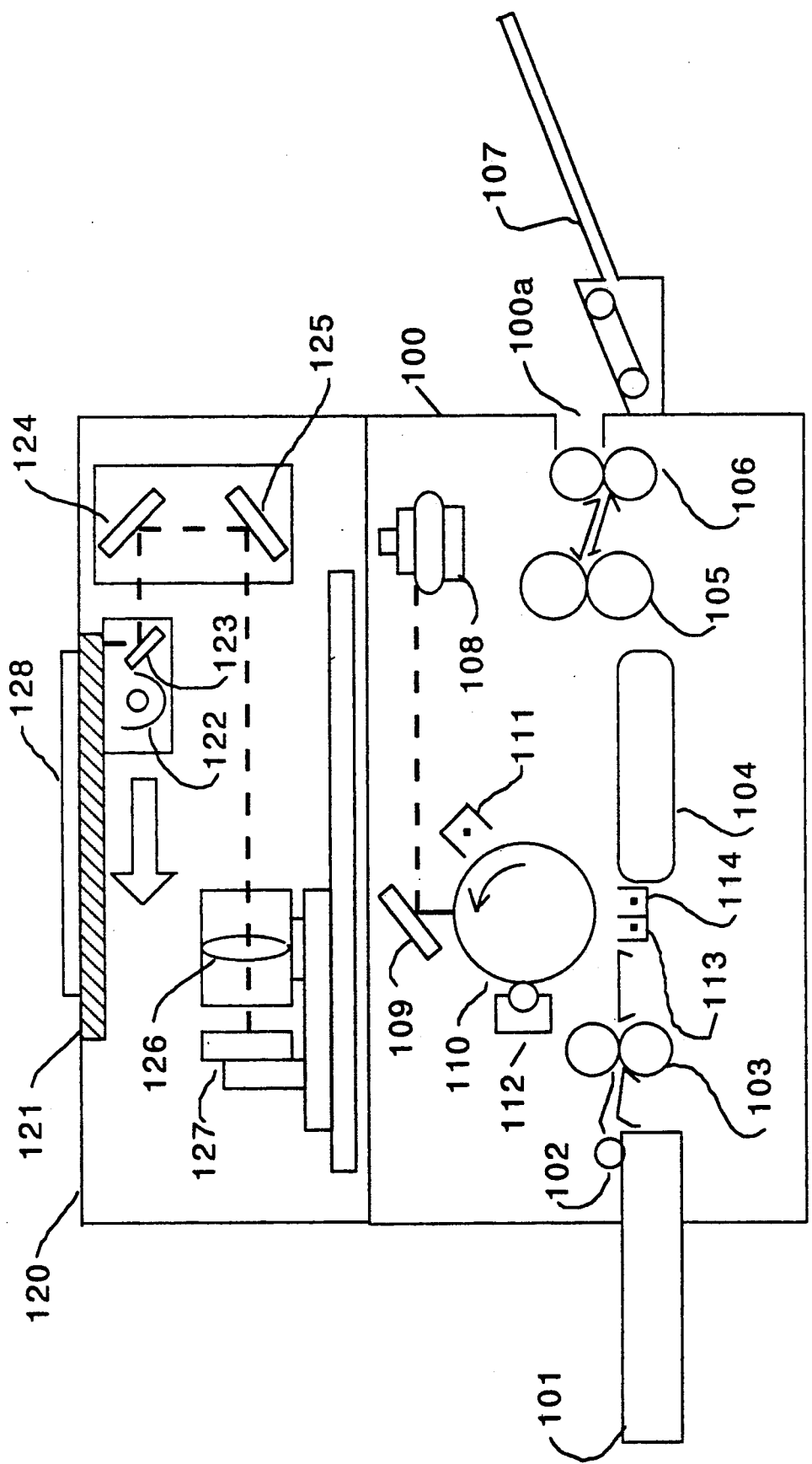
FIG. 3 is an explanatory view of an image scanning section and an image recording section of the facsimile machine.

FIG. 3 is an explanatory view schematically showing an image recording section (or image reproducing section) and an image scanning section of the facsimile machine embodying the present invention.

The recording section forms an electrostatic latent image by means of a laser, which employs electrophotography as the image-forming system.

As will be described later, image data received through a public telephone circuit are subjected to bit expansion processing at an expander 308 (FIG. 5), and are thereafter input to a recorder 307 (FIG. 5) for conversion into bit map data.

The recording section includes a laser 108 operable in response to the bit map data for emitting a laser beam corresponding to the image data.

The emitted laser beam is reflected by a mirror 109, and impinges upon a photoreceptor drum 110. The laser beam scans the drum surface axially of the drum 110 (in the direction perpendicular to the sheet of FIG. 3) at high speed.

The photoreceptor drum 110 is rotatable at a constant speed in the direction of an arrow, and is electrically charged by a corona charger 111 disposed upstream of the position of laser beam impingement with respect to the direction of drum rotation. Consequently, the laser beam forms an electrostatic latent image corresponding to an image pattern on the surface of the drum 110.

The latent image thus formed reaches a developing device 112, and is developed with toner into a visible image.

The visible toner image is transferred to recording paper at the position of a transfer charger 113.

The recording paper is drawn from a paper supply cassette 101 by a feed roller 102. The recording paper is once stopped by a timing roller pair 103, and is thereafter fed with appropriate timing to the position between the photoreceptor drum 110 and transfer charger 113 for receiving the toner image.

After the image transfer, the recording paper is separated from the drum surface by a separating charger 114. Then the recording paper is transported by a conveyer belt 104 to a fixing device 105 where the image is fixed to the recording paper through a heating and pressing process. Subsequently, the recording paper is discharged through a discharge roller pair 106 and an outlet 100a onto the discharge tray 107.

The state of recording paper on the tray 107 will be described in detail later.

{Image Scanning Section}

The image scanning section of this embodiment is schematically shown in an upper portion of FIG. 3.

The image scanning section scans and exposes an original document placed on a document table, and converts its image into an electric signal.

The image scanning section, referenced 120, includes a glass plate 121 acting as the document table, a document cover 128 for overlying an original document to shut off ambient light, an exposure lamp 122 for exposing the original document, mirrors 123, 124 and 125 for transmitting the light reflected from the original document, and a lens 126 and an image sensor (line CCD) 127 arranged along the optical path.

The exposure lamp 122 and mirror 123 are mounted on a first carrier movable at a constant velocity V in the direction of a large arrow for scanning the original document. The mirrors 124 and 125 are mounted on a second carrier movable at a constant velocity V/2.

The principle of photoelectric conversion by CCD 127 is known and is not described herein.

{Control Panel}

Figure 4:
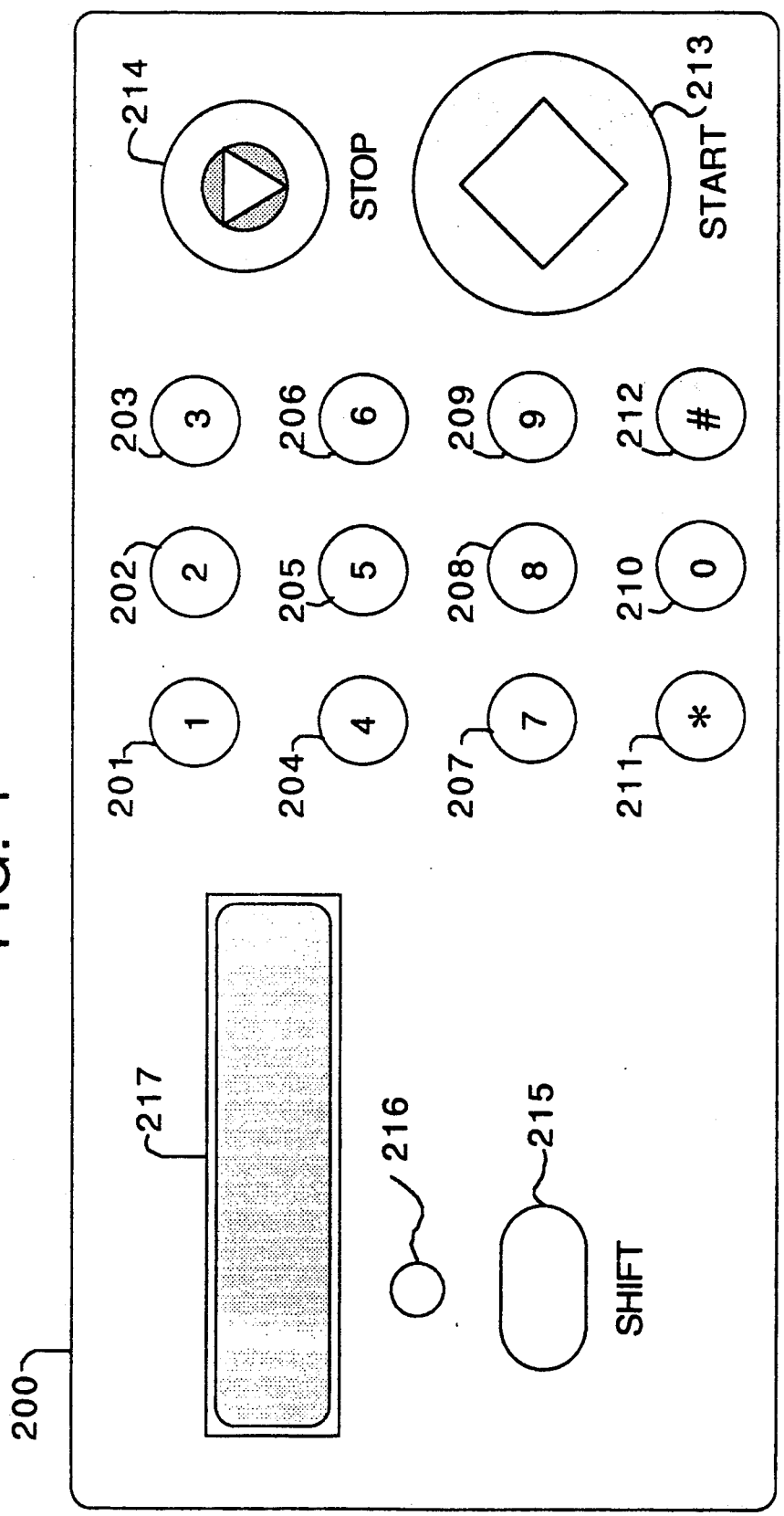
FIG. 4 is an explanatory view of a control panel of the facsimile machine.

FIG. 4 is an explanatory view of a control panel in this embodiment.

As shown, the control panel 200 includes a group of numeric keys 201-210 for designating the number of a facsimile machine to be called, function keys 211 and 212 for adding various functions in combination with other keys, a start key 213 for starting an image transmission, a stop key 214 for discontinuing an image transmission, a shift key 215 for setting and canceling a mode (shift mode) for shifting recording paper on the discharge tray, a shift indicator 216 which is lit for indicating that the shift mode is selected, and a liquid crystal display 217 for displaying an operating sequence of this facsimile machine.

{Control Circuit}

Figure 5:
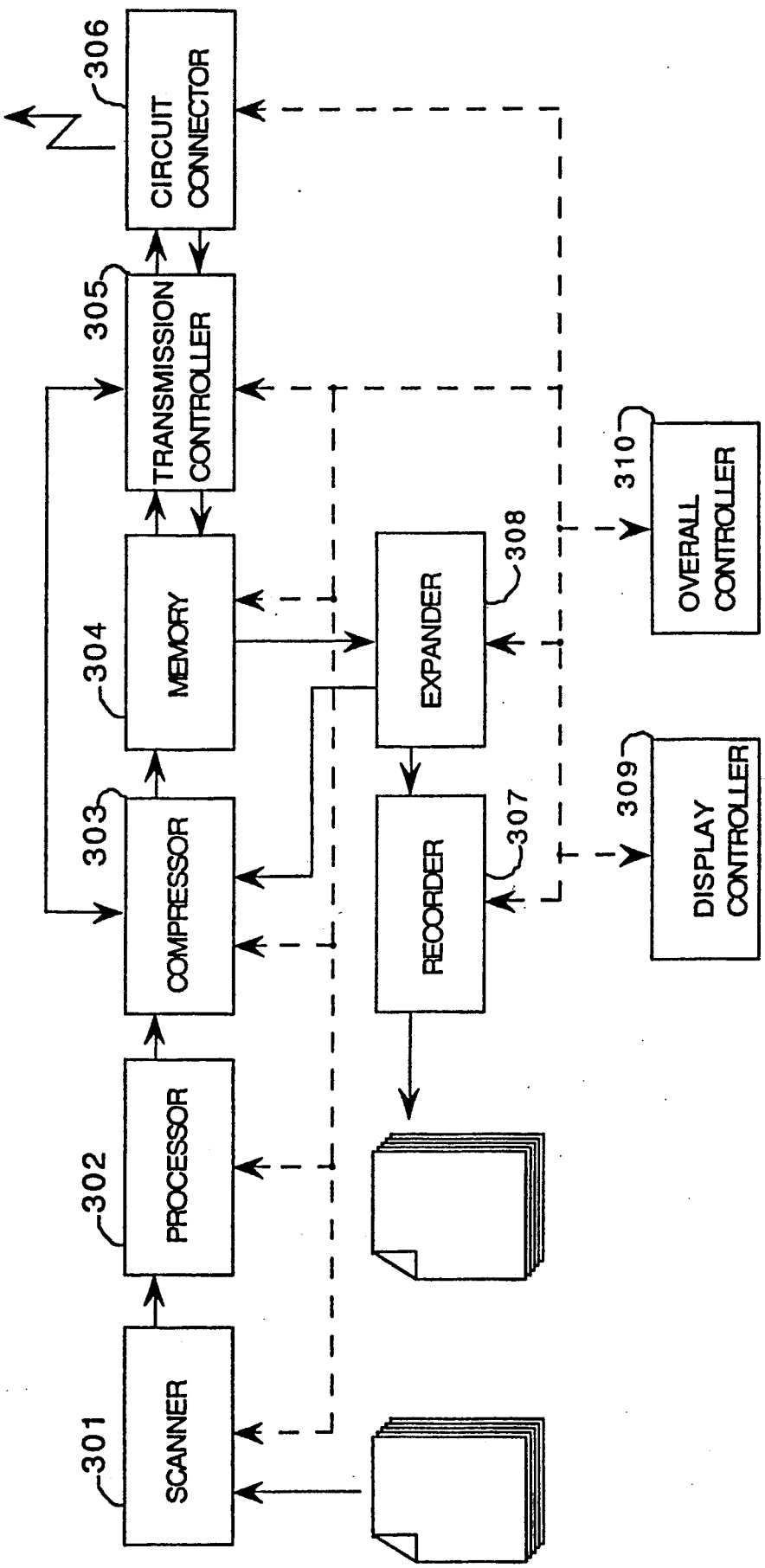
FIG. 5 is a block diagram of a control circuit of the facsimile machine.
Figure 6:
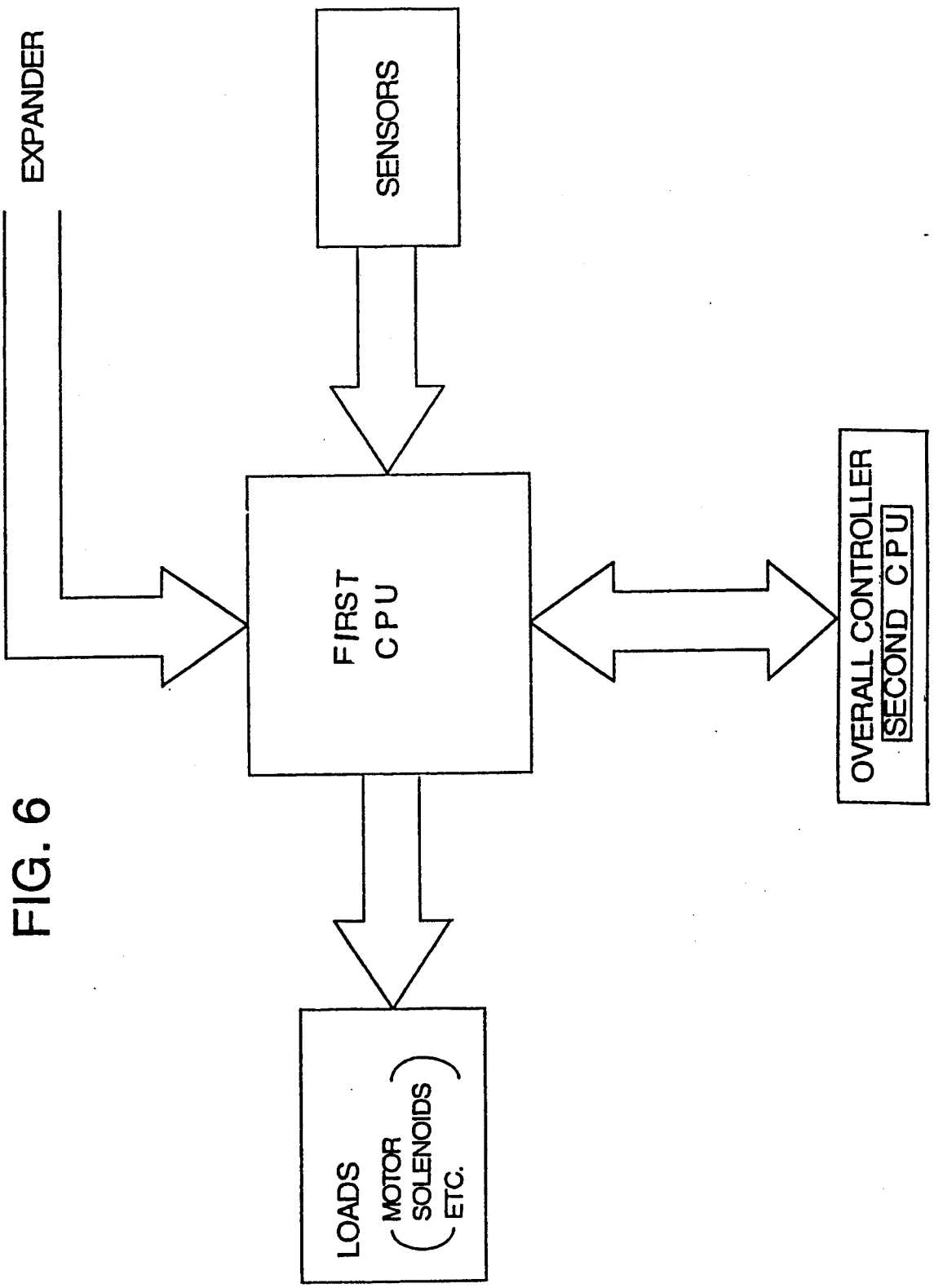
FIG. 6 is an explanatory view of input and output signals of a CPU for controlling the image recording section of the facsimile machine (hereinafter referred to as the first CPU)

FIG. 5 is a block diagram of a control circuit of the facsimile machine. FIG. 6 is an explanatory view showing how signals are input to and output from a first CPU of the recorder 307 shown in FIG. 5.

The illustrated control circuit includes a scanner 301, a processor 302, a compressor 303, a memory 304, a transmission controller 305, a circuit connector 306, the expander 308 and recorder 307 mentioned hereinbefore, a display controller 309, and an overall controller 310.

The scanner 301 controls the operation of the image scanning section shown in FIG. 3 (including scanning of original documents, adjustment and turning on and off of the exposure lamp, driving of the image sensor, and so on).

The processor 302 carries out predetermined processing of an image signal (analog image signal) output from the scanner 301, such as analog-to-digital conversion, shading, binarization, and so on.

The compressor 303 carries out bit compression of image data received from the processor 302 or image data received from the expander 308 (the latter being data once stored in the memory 304 at the image scanning time, without being transmitted to a receiving facsimile machine, and read from the memory 304 and subjected to the bit expansion for transmission at night when the rates of telephone charges are low).

The memory 304 stores bit-compressed image data not to be transmitted immediately through the telephone circuit, and image data to be reproduced on recording paper.

The transmission controller 305 controls transmission to the telephone circuit of image data received from the compressor 303 or memory 304, and storage in the memory 304 of image data received from the circuit connector 306 (i.e. data received through the telephone circuit).

The circuit connector 306 is an interface between the public telephone circuit and this facsimile machine.

The expander 308 carries out bit expansion of the image data stored in the memory 304 (i.e. the image data having undergone the bit compression).

The recorder 307 controls the operation of the image recording section shown in FIG. 3. More particularly, as shown in FIG. 6, the recorder 307 includes a first CPU which receives signals from a group of sensors (including the sensor 154 for detecting presence or absence of recording paper on the tray 107), and control signals (such as commands for setting and canceling the shift mode) from the overall controller 310. In response to these signals, the first CPU drives the various loads of the recording section shown in FIGS. 1, 2 and 3 (such as paper feed and transport motors, a paper feed clutch, the laser, developing device, fixing device, chargers, and so on), for reproducing an image corresponding to the image data on the recording paper for discharge onto the tray 107. Further, the first CPU drives the stepper motor 151 for shifting the recording paper on the tray 107.

the display controller 309 carries out operations for accepting inputs made through the keys on the control panel shown in FIG. 4, and for turning on and off display elements on the control panel.

The overall controller 310 provides comprehensive controls for causing the respective components of the control circuit to operate in timed relations with one another.

{Processing by CPU}

[1] First CPU of Recorder 307

Figure 7:
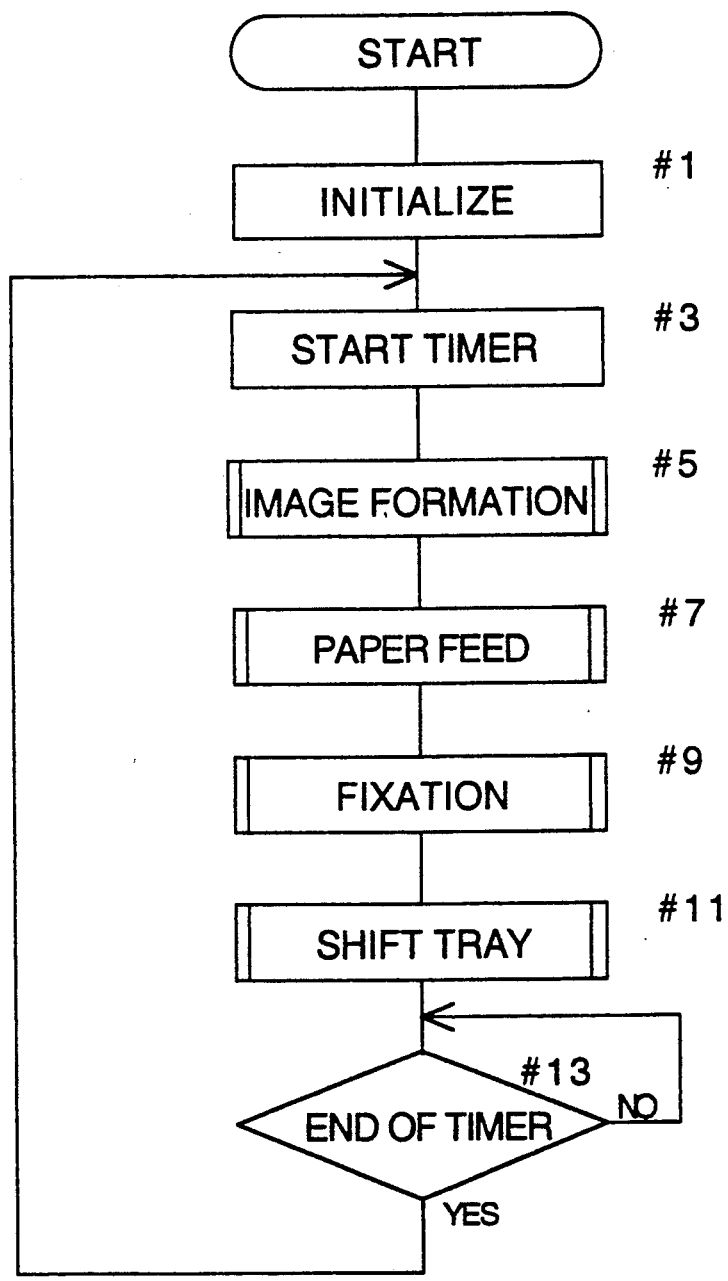
FIG. 7 is a flowchart of a main routine executed by the first CPU for controlling the image recording section.
Figure 8:
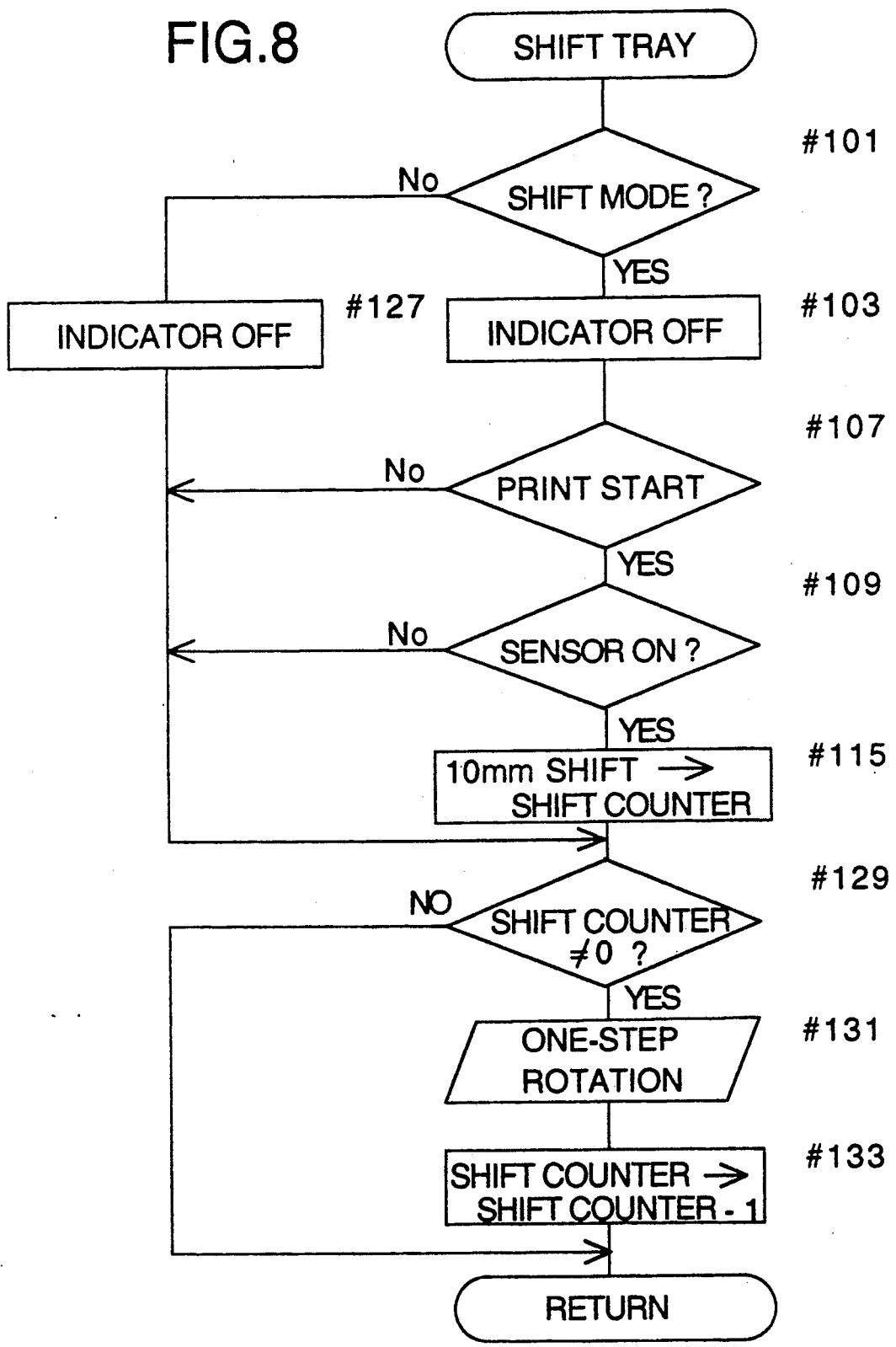
FIG. 8 is a flowchart of a shift tray subroutine in FIG. 7.

FIG. 7 is a flowchart of a main routine executed by the first CPU of the recorder 307. FIG. 8 is a flowchart of the processing carried out at step #11 (shift tray subroutine) in FIG. 7.

<1> Main Routine

The first CPU for controlling the recording section starts its processing operation upon receipt of data from a different facsimile machine, for example.

At step #1 initialization is effected, and at step #3 an internal timer for determining a period of time for one routine is started. The value of the internal timer is set at step #1.

Subsequently, an image-forming subroutine (a routine for controlling the laser, chargers, developing device, photoreceptor drum and so on) is executed at step #5, a paper feed subroutine (a routine for controlling the paper feed and transport motors, paper feed clutch and so on to feed and discharge the recording paper) at step #7, a fixation subroutine (a routine for controlling the fixing device) at step #9, and the shift tray subroutine (a routine for shifting the recording paper on the tray, which will be described later) at step #11. After waiting for the internal timer to expire at step #13, the program returns to step #3 and repeats the above subroutines.

<2> Shift Tray Subroutine (#11)

The shift tray subroutine executed at step #11 will be described next with reference to FIG. 8.

(i) It is determined at step #101 whether the shift mode is selected or not. If it is, the shift mode indicator 216 is turned on at step #103. If not, the indicator 216 is turned off at step #127, and the program returns through step #129 to the main routine.

(ii) The program moves from step #103 to step #107 and waits for start of a printing operation. A printing operation corresponds to a series of data received in one communication. The start of a printing operation corresponds, for example, to start of feeding of a first sheet of recording paper from the paper supply cassette for reproducing the image data received in one communication. The present invention is applicable to a copying machine or the like, in which case a series of original documents means what the series of data received in one communication means to the facsimile machine.

(iii) If start of a printing operation is detected at step #107, the program moves to step #109 for checking through the sensor 154 whether recording paper is present on the tray or not. The program moves to step #115 if recording paper is found on the tray, and jumps to step #129 if not.

(iv) At step #115, a count corresponding to a 10 mm shift is substituted to a shift counter. This shift counter is a counter for determining the number of steps to be taken by the stepper motor 151.

(v) The program moves from step #115 to step #129 for driving the stepper motor 151 forward until the count of the shift counter becomes zero (steps #129, #131 and #133), for causing the rubber belt 150 to shift the recording paper.

The period of time for the first CPU of the recorder 307 to execute the main routine is 5 msec. Thus, steps #129, #131 and #133 are repeated every 5 msec. As a result, the rubber belt 150 is moved every 5 msec. by a distance corresponding to one step of the stepper motor 151.

In this way, the recording paper remaining on the tray 107 is shifted.

[2] Second CPU of Overall Counter 310

Figure 9:
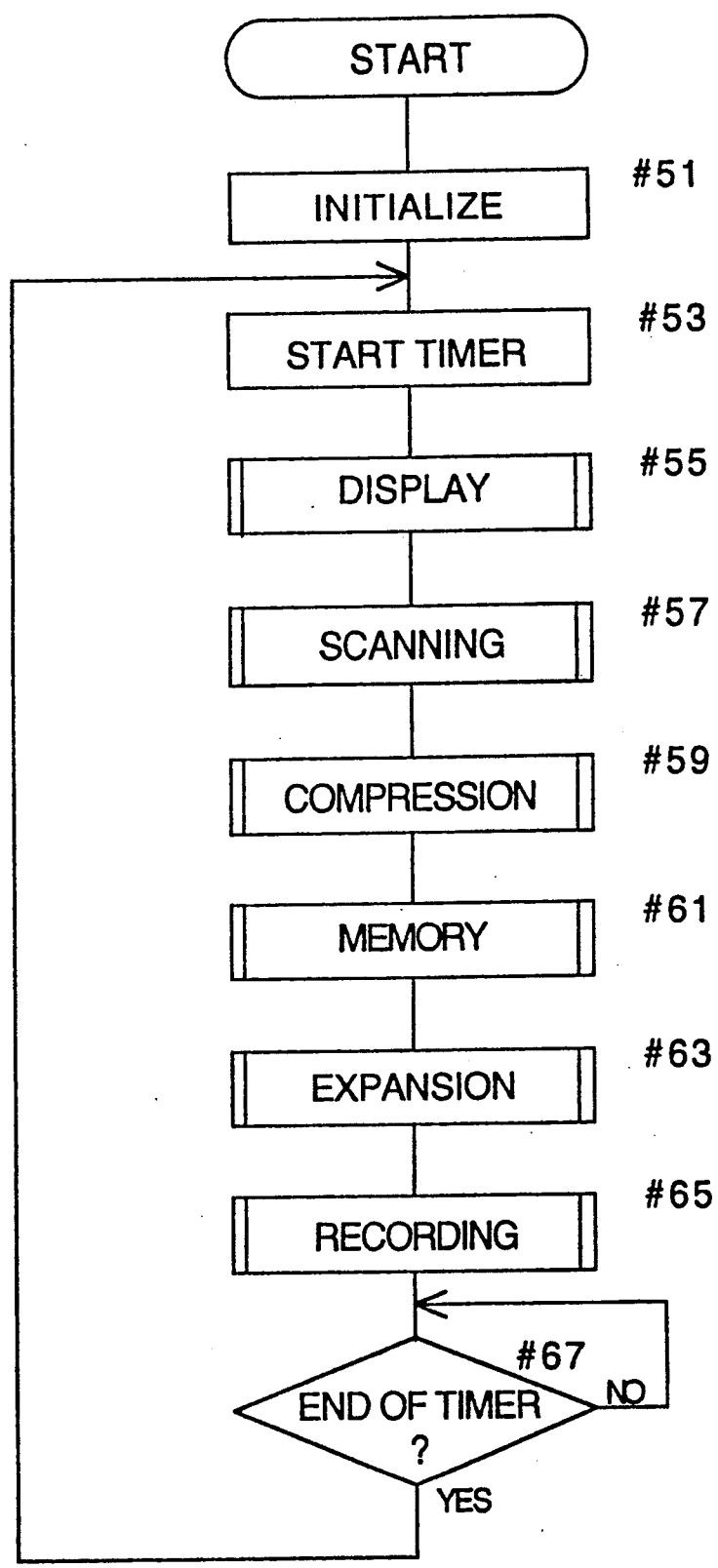
FIG. 9 is a flowchart of a main routine executed by a CPU included in a recorder shown in FIG. 5 (hereinafter referred to as the second CPU)
Figure 10:
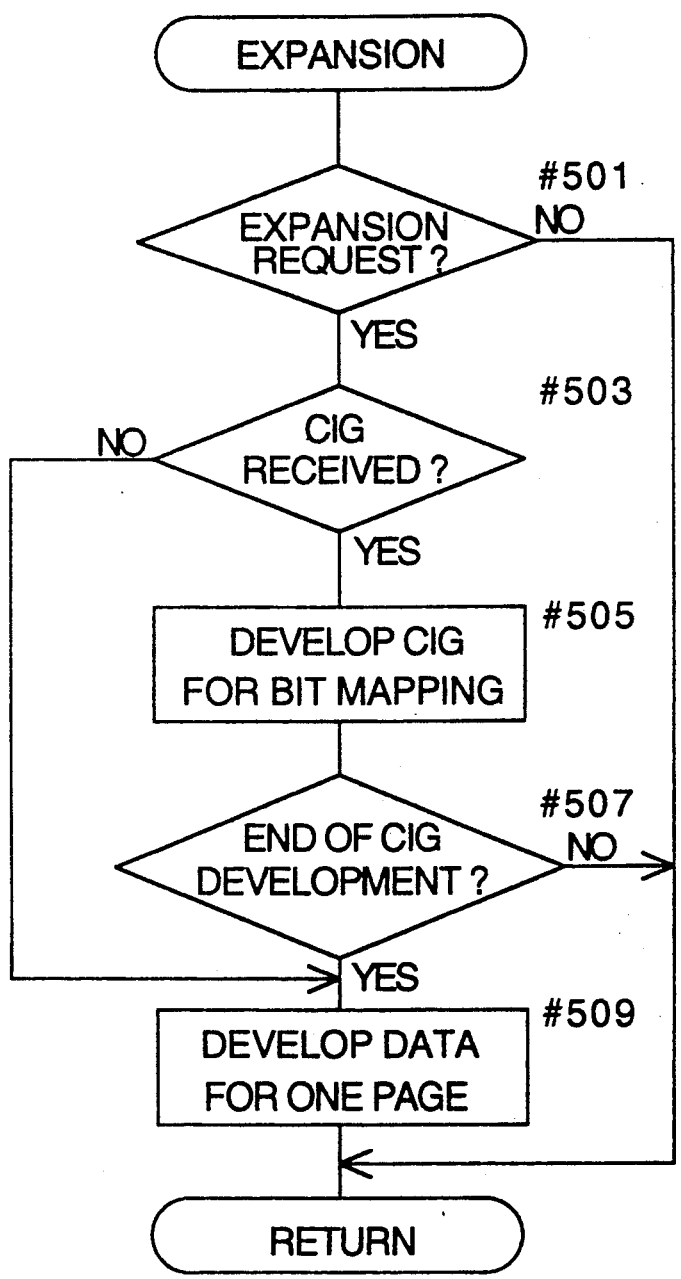
FIG. 10 is a flowchart of an expansion subroutine in FIG. 9.

FIG. 9 is a flowchart of a main routine executed by the second CPU of the overall controller 310. FIG. 10 is a flowchart of the processing carried out at step #63 (expansion subroutine) in FIG. 9.

<1> Main Routine

The second CPU for controlling the overall controller 310 starts its processing operation, for example, when the facsimile machine is switched on.

At step #51 initialization is effected, and at step #53 an internal timer for determining a period of time for one routine is started. The value of the internal timer is set at step #51.

Subsequently, a control display subrouting (a routine for controlling the display controller 309) is executed at step #55, a scanning subroutine (a routine for controlling the scanner) at step #57, a compression subroutine (a routine for controlling the compressor) at step #59, a memory subroutine (a routine for controlling the memory) at step #61, an expansion subroutine (a routine for controlling the expander) at step #63, and a recording subroutine (a routine for controlling the recorder by giving commands such as a print start request) at step #65. After waiting for the internal timer to expire at step #67, the program returns to step #53 and repeats the above subroutines.

<2> Expansion Subroutine (#63)

The expansion subroutine executed at step #63 will be described next with reference to FIG. 10.

If an expansion request occurs from a different subroutine (for example, when compressed data for one page have accumulated at a time of data receipt through a communication), the program moves from step #501 to step #503.

Step #503 is executed for determining whether a signal identifying the sending facsimile machine (CIG data or sender data) has been received or not. If it has, the program moves to step #505 for developing its code data into actual image data for writing into a leading part of a page memory in the recorder.

When step #507 finds completion of the data processing regarding the sender, the program moves to step #509 for expanding the received data (compressed image data) corresponding to one page to be written into the page memory in the recorder.

In this way, the sender identifying data is printed on a leading end portion of recording paper (the portion exposed as the recording paper is shifted on the tray) for enabling the receiver to recognize the sender data visually and positively.

In the described embodiment, the start of a printing operation is used for detecting a demarcation between individual communications received. Instead, start of each communication received may be detected in the type of facsimile machine that gives a printout every time communications are received. With the type of facsimile machine in which image data received in a plurality of communications are once stored in a memory and printed all at a time later, demarcations between the communications may be detected when the data are read from the memory. The mode of detecting the demarcation by the start of a printing operation as in this embodiment is applicable to both types of facsimile machines.

Further, the recording paper may be shifted on the tray with the demarcation marked by completion of a printing operation, e.g. discharge of the final sheet of recording paper reproducing a series of incoming data.

Second Embodiment

The second embodiment is basically the same as the first embodiment, and the difference therebetween resides in the distance of movement of recording paper for sorting purposes. Only those parts of the second embodiment varied from the first embodiment will be described to avoid unnecessary repetition. Reference will also be made to FIGS. 1 and 2 for describing the second embodiment.

{Paper Discharge Tray and Adjacent Components}

Figure 12:
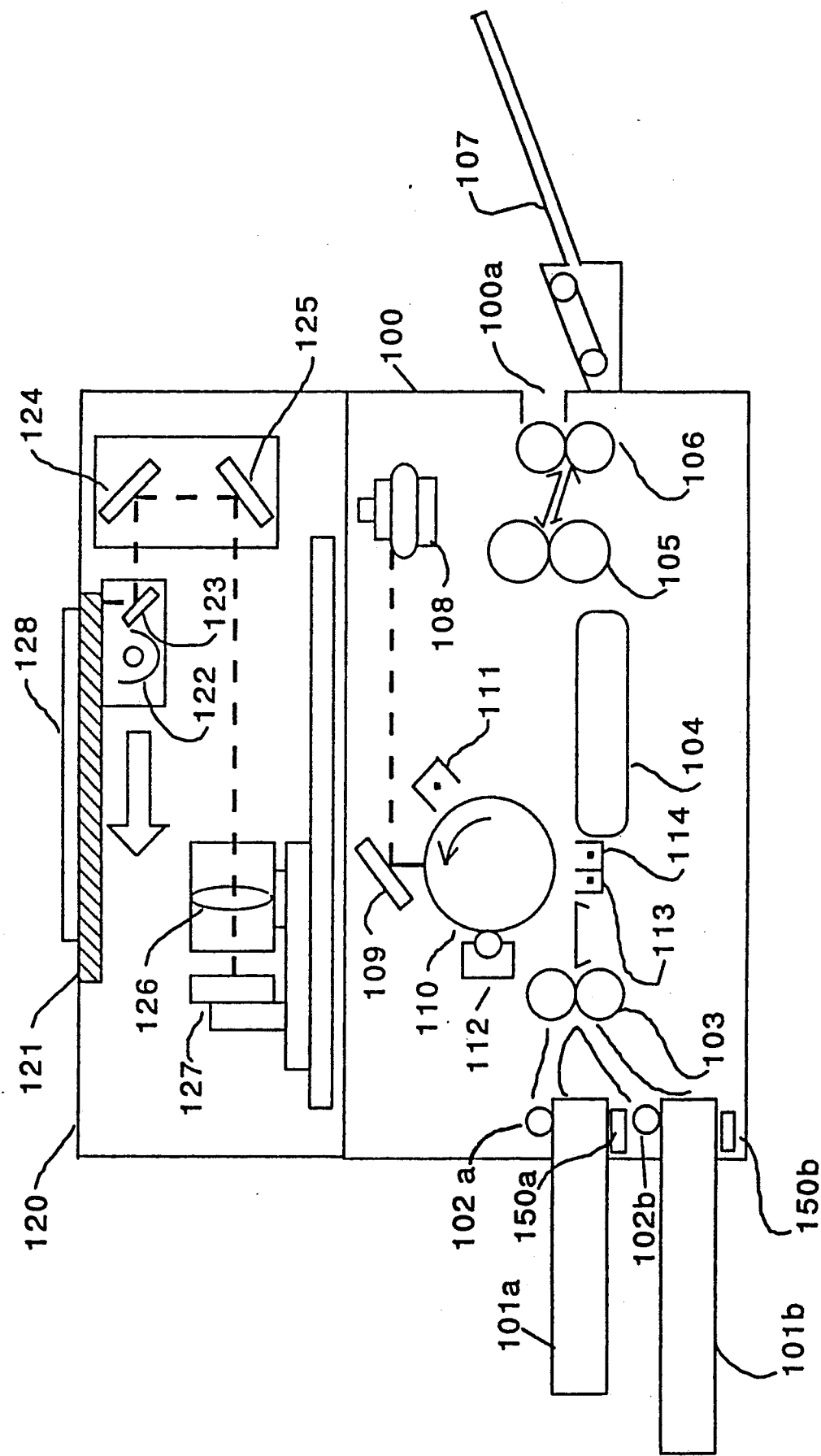
FIG. 12 is an explanatory view of a facsimile machine according to a second embodiment of the present invention.

In the second embodiment as shown in FIG. 12, when recording paper is discharged onto the tray 107 empty of preceding recording paper, the rubber belt 150 is driven backward (in the direction to shift the discharged recording paper toward the side wall 100 of the facsimile machine), as particularly described later, with discharge of a first sheet. This step is taken in order to position the rear end of the first sheet by using the side wall 100.

On the other hand, when recording paper is discharged onto the tray 107 on which preceding recording paper remains, the rubber belt 150 is driven forward (in the direction of arrow i), as particularly described later, before discharge of a first sheet. This step is taken in order to shift the already discharged recording paper a slight distance rightward prior to discharge of further recording paper resulting from receipt of a new data communication. By so shifting the preceding recording paper, the leading end portion thereof (the righthand margin where, usually, the telephone number and other information identifying the sender are recorded) will not be covered by the newly discharged recording paper.

The shifting distance is, for example, 10 mm (which corresponds to the width for recording the information identifying the sender) provided that the preceding recording paper and newly discharged paper are the same size.

If the preceding paper and newly discharged paper are different in size, the shifting distance is determined taking the size difference into account, as particularly described later, so that the leading end of the preceding paper is not covered by the newly discharged paper.

Previously discharged recording paper is successively shifted rightward prior to discharge of further recording paper occurring with each new data communications. As a result, sheets of recording paper are sorted out according to the order of discharge. Normally, the sorting is carried out in a manner for enabling visual recognition of the data identifying the senders.

{Image Recording Section}

FIG. 12 schematically shows the image recording section of the second embodiment. According to the second embodiment, recording paper is fed from the cassette holding the recording paper suited to the size of incoming image data. More particularly, recording paper is drawn from one of paper supply cassettes 101a and 101b by a feed roller 102a or 102b. The recording paper is once stopped by the timing roller pair 103, and is thereafter fed with appropriate timing to the position between the photoreceptor drum and transfer charger for receiving a toner image.

After the image transfer, the recording paper is separated from the drum surface by the separating charger 114. Then the recording paper is transported by the conveyer belt 104 to the fixing device 105 where the image is fixed to the recording paper through a heating and pressing process. Subsequently, the recording paper is discharged through the discharge roller pair 106 and outlet 100a onto the discharge tray 107. Reference numerals 150a and 150b denote paper size detecting switches for detecting the sizes of recording paper stored in the respective paper supply cassettes 101a and 101b.

The state of recording paper on the tray 107 will be described in detail later.

{Processsing by CPU}

<1>Main Routine

The main routine is the same as in the first embodiment and will not be described again.

<2>Shift Tray Subroutine

Figure 13A:
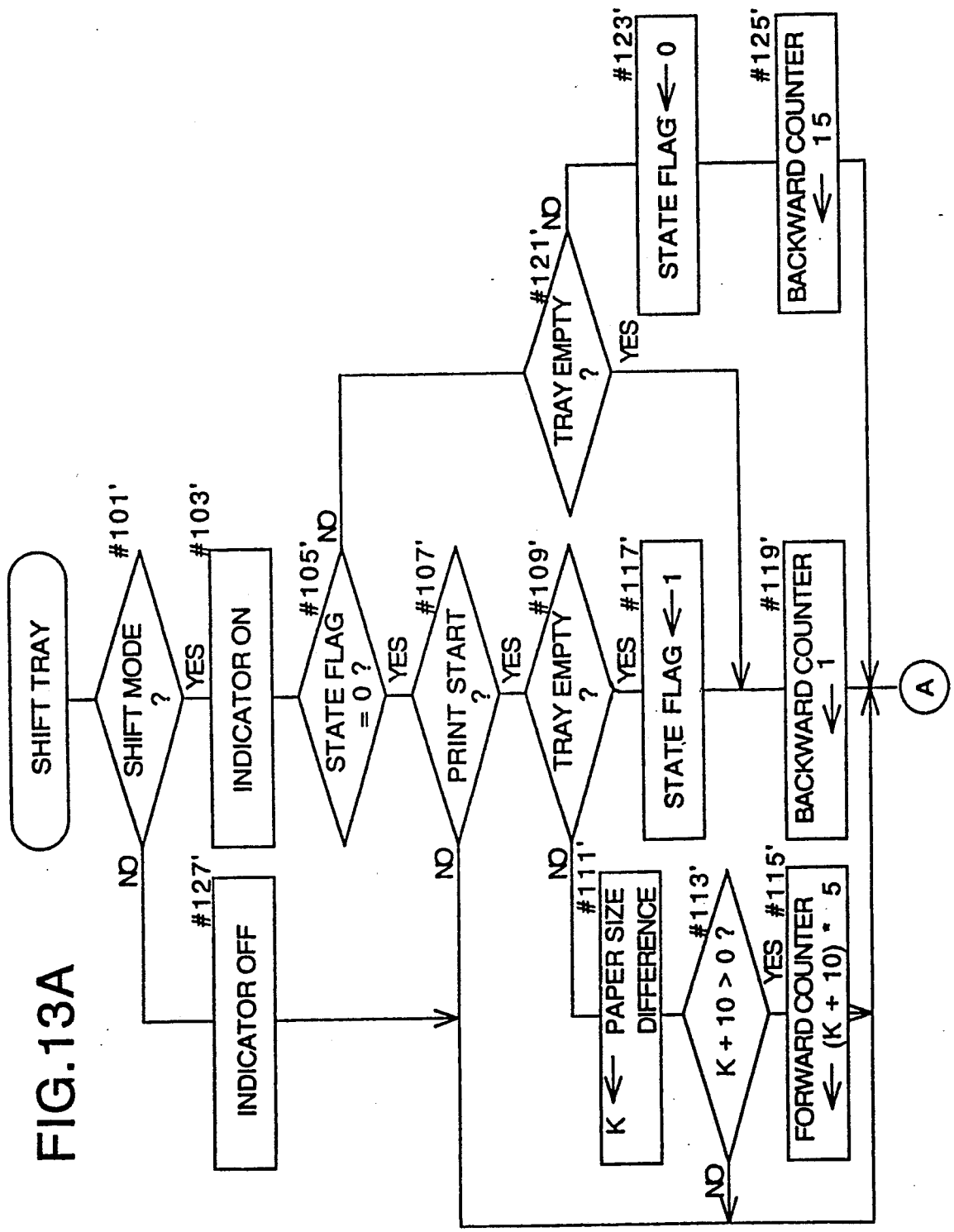

A shift tray subroutine will be described next with reference to FIGS. 13A and 13B.

In this subroutine, varied operations are carried out when new data are received, depending on presence or absence of preceding recording paper on the tray 107, as follows:

<When No Recording Paper is Present on Tray 107>

(i) It is determined at step #101' whether the shift mode is selected or not. If it is, the shift mode indicator 216 is turned on at step #103'. If not, the indicator 216 is turned off at step #127', and the program returns through step #129' to the main routine.

(ii) The program moves from step #103' to #105' for checking a state flag. The state flag is initially set to zero.

If the state flag shows zero, the program moves to step #107' and waits for start of a printing operation. In this embodiment, the start of a printing operation is set to a command for feeding recording paper. A printing operation corresponds to a series of data received in one communication. The start of a printing operation corresponds, for example, to start of feeding of a first sheet of recording paper from one of the paper supply cassettes for reproducing the image data received in one communication. The present invention is applicable to a copying machine or the like, in which case a series or original documents is equivalent to the series of data received in one communication.

(iii) If start of a printing operation is detected at step #107', the program moves to step #109' for checking from a signal from the sensor 154 whether recording paper is present on the tray 107 or not.

(iv) In the absence of recording paper from the tray 107, the state flag is set to "1" at step #117', and "1" is substituted to a backward counter at step #119'.

The backward counter is a counter for reversing the belt drive stepper motor 151 to drive the rubber belt 150 backward (in the direction to move the recording paper on the belt toward the machine body). The belt drive motor 151 is rotated backward until the backward counter shows zero (steps #135', #137' and #139'). The belt drive motor 151 is rotatable by one step every time this subroutine is executed, that is every 5 msec. in this embodiment. The rubber belt 150 is moved 1 mm with five steps of the belt drive motor 151.

(v) In executing this subroutine, the program moves to step #121' after steps #101', #103' and #105'. It is checked at step #121' whether or not the tray 107 is loaded with recording paper, i.e. whether a first sheet of recording paper has been discharged onto the tray 107 as a result of the new image data receipt.

If no recording paper is found on the tray 107, the program moves to step #119' for substitutes "1" to the backward counter again. As a result, steps #135', #137' and #139' are executed for driving the belt 150 backward.

If, at step #121', recording paper is found to be present after the above processes are repeated, that is if the first sheet of recording paper has been discharged onto the tray 107 as a result of the new image data receipt, the state flag is reset at step #123', and "3×5(=15)" is substituted to the backward counter at step #125'. This substitution is made for effecting backward rotation by 15 steps after this point of time (to move the rubber belt 150 backward by 3 mm which is a distance between the paper detecting sensor 154 and side wall 100).

(vii) When this subroutine is executed following steps #135', #137' and #139', the program moves through steps #101', #103' and #105' to step #107'.

Step #107' gives "Yes" only at the time for starting paper feed. Consequently, the program moves from step #107' through step #129' directly to step #135' which is followed by steps #137' and #139'.

This process is repeated thereafter until the backward counter shows zero. In this way, the backward drive by 15 steps is effected after the setting made at step #125'.

After the count of the backward counter becomes zero, this subroutine moves through steps #101', #103', #105', #107', #129' and #135' before a return to the main routine. In other words, this subroutine is in substance not executed until start of a printing operation based on a next receipt of image data.

<When Recording Paper is Present on Tray 107>

(I) The processing at steps #101', #103', #105' and #107' (with step #105' giving "Yes" in the initial state) is the same as in the foregoing paragraphs (i) through (iii).

Upon detection of the start of a printing operation, i.e. the start of paper feed, based on receipt of new image data, the program moves to step #109' for checking from a signal from the paper sensor 154 whether recording paper is present on the tray 107.

(II) If step #109' gives "No", that is if recording paper is present on the tray 107, the program moves to step #111' for substituting to internal variable K;

(length of the recording paper used this time length of the recording paper used previously). The unit used is millimeter. The program then moves to step #113'.

(III) Checking is made at step #113' whether a sum of K and 10 is positive or not, i.e. whether the sum is greater than zero.

This checking is made in order to determine whether the recording paper already present on the tray 107 (i.e. the recording paper reproducing previously received image data) should be shifted in the same direction as the direction of discharge (hereinafter referred to as the forward direction) for sorting from the recording paper to be newly discharged.

Referring to FIG. 14, when newly discharged recording paper B is smaller than previously discharged recording paper A, the latter need not be shifted at all. There is no possibility of the previously discharged paper becoming completely covered and hidden by the newly discharged paper, and hence no need for the sorting action.

However, when newly discharged recording paper b is larger than previously discharged paper a as shown in FIG. 15, the previously discharged paper must be moved in the forward direction by a distance corresponding to the difference in size (difference in length).

The value of K plus 10 is checked instead of just K in order to shift the previously discharged recording paper a so that the lading end (the righthand end in FIG. 15) is exposed by 10 mm from the newly discharged paper b.

If step #113' gives "No", that is if the recording paper to be discharged at this time is smaller than the previously discharged paper, the program moves through step #129' and returns to the main routine.

If step #113' gives "Yes", the program moves to step #115'.

(IV) At step #115', the value (K+10)×5 is substituted to a forward counter. The forward counter is a counter for determining the number of steps (in the forward direction) taken by the belt drive motor 151.

In the second embodiment, as described above, the recording paper is shifted on the tray 107 by the rubber belt 150. The rubber belt 150 is moved 1 mm with five steps of the belt drive motor 151. Therefore, the length of paper movement (K+10) is multiplied by 5.

(V) The program moves from step #115' to step #129' for rotating the stepper motor 151 forward until the count of the forward counter becomes zero (steps #129', #131') for causing the rubber belt 150 to shift the recording paper.

As noted hereinbefore, the time for the first CPU of the recorder 307 to execute the main routine is 5 msec. Therefore, steps #129', #131' and #133' are repeated every 5 msec, whereby the rubber belt 150 moves 1 mm in 25 msec.

In this way, the recording paper on the tray 107 is shifted under control.

The present invention is applicable also to a machine that cuts rolled paper for discharge.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
   image recording means for recording on recording paper a series of image data received through a communication line;
   tray means for holding the recording paper carrying images;
   shift means for shifting a position of the recording paper placed on said tray means, said shift means operating stepwise and shifting the position of the recording paper in a predetermined single direction by a predetermined distance for each stepwise operation thereof; and
   control means for controlling said shift means so as to execute one stepwise shift operation of said shift means in timed relation to each of an operation for recording a series of image data, whereby the recording paper on said tray means is shifted stepwise in said predetermined single direction by said predetermined distance for each recording operation of a series of image data.

2. An image forming apparatus comprising:
   image forming means for recording on recording paper a series of image data received through a communication line;
   tray means for holding the recording paper carrying images;
   shift means for moving the recording paper placed on said tray means a predetermined distance in a predetermined direction parallel to a direction of discharge of the recording paper onto said tray means; and
   control means for actuating said shift means in timed relation to an operation for recording said series of image data.

3. An image forming apparatus as claimed in claim 2, wherein said shift means includes a conveyer belt, and a drive source for driving said conveyer belt.

4. An image forming apparatus as claimed in claim 1, wherein said control means is operable for actuating said shift means when the operation for recording said series of image data is started.

5. An image forming apparatus as claimed in claim 1, wherein said control means is operable for actuating said shift means when the operation for recording said series of image data is completed.

6. An image forming apparatus comprising:
   image recording means for recording on recording paper a series of image data received through a communication line, and recording additional information other than said image data on one end of the recording paper;
   tray means for holding the recording paper carrying images;
   discharge means for discharging the recording paper onto said tray means with one end thereof carrying said additional information acting as a leading end;
   shift means for shifting a position of the recording paper placed on said tray means, said shift means operating stepwisely and shifting the position of the recording paper in a direction of discharge by a predetermined distance for each stepwise operation thereof; and
   control means for controlling said shift means so as to execute one stepwise shift operation of said shift means in timed relation to each of an operation for recording a series of image data whereby the recording paper on said tray means is shifted stepwisely in said discharge direction by said predetermined distance for each recording operation of a series of image data.

7. An image forming apparatus as claimed in claim 6, wherein said control means is operable for actuating said shift means when the operation for recording said series of image data is started.

8. An image forming apparatus as claimed in claim 7, further comprising detecting means for detecting the recording paper on said tray means, said control means being operable for actuating said shift means if the recording paper is present on said tray means when the operation for recording said series of image data is started.

9. An image forming apparatus as claimed in claim 6, wherein said control means is operable for actuating said shift means when the operation for recording said series of image data is completed.

10. An image forming apparatus comprising:

a main housing;

image forming means mounted in said main housing for recording images on recording paper;

tray means attached to said main housing for holding the recording paper carrying the images;

shift means rotatable in a first direction for shifting the recording paper on said tray means away from said main housing, and in a second direction opposite to said first direction for shifting the recording paper on said tray means toward said main housing;

detecting means for detecting the recording paper on said tray means; and control means operable with start of a recording operation for rotating said shift means in said second direction when said tray means is empty of the recording paper, and in said first direction when said tray means is loaded with the recording paper.

11. An image forming apparatus as claimed in claim 10, wherein said tray means includes a paper holding surface extending upwardly away from said main housing for supporting thereon the recording paper carrying the images.

* * * * *

UNITED STATES PATENT AND TRADEMARK OFFICE
CERTIFICATE OF CORRECTION

PATENT NO. : 5,128,762
DATED : July 7, 1992
INVENTOR(S) : Hideo Muramatsu, et al.

It is certified that error appears in the above-identified patent and that said Letters Patent is hereby corrected as shown below:

In col. 2, line 25, change "a recorder" to --an overall controller--.

In col. 5, line 53, change "the" to --The--.

In col. 6, line 65, change "Counter" to --Controller--.

In col. 10, line 4, change "substitutes" to --substituting--.

In col. 11, line 10, change "lading" to --leading--.

In col. 11, line 31, after "#131'" insert --and #133'--.

Signed and Sealed this

Seventh Day of September, 1993

Attest:

BRUCE LEHMAN

Attesting Officer

Commissioner of Patents and Trademarks